United States Patent [19]

Friello et al.

[11] 4,316,915

[45] Feb. 23, 1982

[54] CENTER-FILLED CHEWING GUMS

[75] Inventors: Dominick R. Friello, Danbury, Conn.; Ellery Parker, Johnstown; Donald A. M. Mackay, Pleasantville, both of N.Y.; Subraman R. Cherukuri, Danbury, Conn.

[73] Assignee: Life Savers, Inc., New York, N.Y.

[21] Appl. No.: 238,312

[22] Filed: Feb. 26, 1981

Related U.S. Application Data

[63] Continuation of Ser. No. 80,714, Oct. 1, 1979, abandoned.

[51] Int. Cl.$^3$ ............................................. A23G 3/30
[52] U.S. Cl. ...................................... 426/5; 426/103; 426/282

[58] Field of Search ........................................ 426/3-6, 426/282, 103

[56] References Cited

U.S. PATENT DOCUMENTS 3,894,154  7/1975  Graff et al. ............................. 426/5
4,156,740  5/1979  Glass et al. ............................ 426/3

Primary Examiner—Jeanette M. Hunter
Attorney, Agent, or Firm—Lawrence S. Levinson; Burton Rodney

[57] ABSTRACT

Center-filled chewing gum is provided which includes as the center fill a dispersion of a thickener, such as carboxymethyl cellulose in glycerin, the glycerin functioning as both a sweetener and carrier, and the thickener functioning to retard increase in viscosity of the glycerin.

13 Claims, No Drawings

CENTER-FILLED CHEWING GUMS

This is a continuation, of application Ser. No. 80,714, filed Oct. 1, 1979 now abandoned.

BACKGROUND OF THE INVENTION

U.S. Pat. No. 3,894,154 to Graff et al discloses a center-filled chewing gum which includes as a liquid fill an aqueous solution having a dissolved solids portion, and a humectant for retarding increase in viscosity of the center fill. The dissolved solids portion may include invert sugar, sucrose and glucose, while the humectant is glycerine.

British Pat. No. 1,469,031 discloses a center-filled chewing gum similar to that disclosed in U.S. Pat. No. 3,894,154 except that in addition to glycerine, the humectant may be polylimonene, sorbitol solution, lecithin, dextrose, gum arabic, glyceryl monostearate, polyethylene glycol or propylene glycol.

U.S. Pat. No. 4,156,740 to Glass et al discloses a center-filled chewing gum which includes in both the chewing gum shell and the center fill A. from 0.4 to 1 part by weight of a natural or synthetic gum, namely, carboxymethyl cellulose, pectin, propylene glycol, alginates, agar or gum tragacanth; B. from 50 to 84 parts by weight of a glycerin humectant; and C. from 15 to 49.6 parts by weight of an additional water-miscible humectant ingredient which is sorbitol solution or sorbitol solution and propylene glycol.

DESCRIPTION OF THE INVENTION

In accordance with the present invention, there is provided a center-filled chewing gum piece which includes an enclosed cavity containing a liquid fill formed of from about 94 to about 99.5% by weight of a glycerin dispersion containing from about 0.5 to about 6% by weight of a thickening agent, and optionally other sweeteners and flavors.

Surprisingly, it has been found that the substantially all glycerin center fill containing a small amount of thickener retains its liquidity in the center fill for surprisingly long periods of time while providing a pleasant sweet taste. Thus, the center-filled chewing gum of the invention will have an extended shelf-life.

As indicated, the liquid fill will be formed of substantially all glycerin. The glycerin which may be employed may be commercial grade, that is, it may contain 1 to 4% bound up water.

The glycerin functions as a sweetener and vehicle for flavor and/or other sweeteners and thus is particularly suitable for use in a sugarless liquid fill which will usually be employed in a sugar-free center-filled chewing gum.

The thickening agent or thickener is employed to increase the viscosity of the glycerin which itself is stable and comprises the center fill. The thickening agent will usually not dissolve in the center fill (glycerin) but will only appear to dissolve by forming a colloidal dispersion with the glycerin.

The thickening agent will be present in the center fill in an amount within the range of from about 0.5 to about 6% by weight based on the total content of the center fill, and preferably from about 1 to about 3% by weight of the center fill.

Examples of thickening agents which may be employed in the center fill together with glycerin include, but are not limited to, synthetic or natural gums, such as carboxymethyl cellulose, pectins, alginates, namely, esters of alginic acid, such as propylene glycol alginate, agar, gum tragacanth, hydroxypropyl cellulose, hydroxyethylcellulose, gelatin, and the like. The preferred thickening agent for use herein is carboxymethyl cellulose, which may be in the form of sodium carboxymethyl cellulose, and may have a viscosity of from 400 to 4,500 centipoises at 1% concentration, and more preferably a viscosity of 1000–3000 at 1% concentration such as CMC 7HF or CMC 7MF (available from Hercules, Inc.).

In addition, the center fill may contain flavor, for example, in the form of flavor oil, in an amount of from about 0.10 to about 0.75% by weight, and preferably, from about 0.10 to about 0.50% by weight.

Where the liquid fill is to include additional sweetener, such sweetener may comprise a sugar sweetener, a sugar alcohol, or other non-sugar sweeteners. In the case where the additional sweetener is a sugar, such sugar may be present in an amount of from about 2 to about 15% by weight, and preferably, from about 3 to about 10% by weight; where the additional sweetener is a sugar alcohol such as sorbitol, and/or mannitol or xylitol, the sugar alcohol may be present in an amount within the range of from about 5 to about 30% by weight, and preferably, from about 3 to about 15% by weight; where the additional sweetener is an artificial sweetener such as, for example, aspartame or Acesulfame-K (Hoechst), cyclamate, or other sweetener as described hereinafter, the artificial sweetener may be present in an amount of from about 0.05 to about 0.35% by weight, and preferably, from about 0.03 to about 0.25% by weight.

The liquid fill itself will generally comprise from about 5 to about 15% by weight, and preferably, from about 7 to about 10% by weight of the final chewing gum piece itself.

The preferred liquid fill compositions in accordance with the present invention are as follows:

|  | Parts by Weight |
|---|---|
| Glycerin (containing up to 2% bound up water) | 95 to 99.5 |
| Thickener | 5 to 0.80 |
| Optional sweetener |  |
| sugar | 0 to 5.0 |
| sugar alcohol | 0 to 5.0 |
| artificial sweetener | 0 to 0.20 |

Flavors which are especially useful in the liquid fill comprise flavor oil, including acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the center fill.

As indicated, in addition to the glycerin, the liquid fill may include a natural sugar or non-sugar sweetener.

The term "natural sugar" includes one or more sugars or sugar containing material, or sugar alcohols, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose such as cane or beet sugar, lactose, maltose or cellobiose; polysaccharides, such as partially hydrolyzed starch, dextrin or corn syrup solids, or sugar alcohol, such as sorbitol, xylitol, mannitol or arabitol.

In addition, as mentioned hereinbefore, the glycerin may be employed together with an artificial or non-sugar sweetener or sugar substitute, such as sodium, calcium or ammonium saccharin salts, dihydrochalcones, glycyrrhizin, dipotassium glycyrrhizin, glycyrrhizic acid ammonium salt, the sodium salt of cyclohexyl sulfamic acid, L-aspartyl-L-phenylalanine methyl ester, the potassium salt of 3,4-dihydro-6-methyl-1,2,3-oxathiazine-4-one-2,2-dioxide (Acesulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The center-fill portion of the chewing gum of the invention may be prepared by adding the thickening agent, preferably carboxymethyl cellulose, in the form of a powder to glycerin (which may be of commercial grade), and mixing until the thickening agent is dispersed throughout the glycerin to form a pourable colloidal gel or colloidal dispersion. No water need be added; the thickener is not and need not be dissolved in water. The other ingredients, namely flavors and/or sweeteners, may be added to the glycerin before or after adding the thickening agent.

The chewing gum portion of the center-filled chewing gum of the invention may comprise conventional sugarless or sugar-containing chewing gums. Inasmuch as the glycerin-thickening agent containing liquid center fill described herein will preferably be sugar-free, the center fill is especially suitable for use in conjunction with sugar-free chewing gum. An example of a particularly preferred chewing gum for use herein which has good extrusion properties as well as long shelf-life and long-term flexibility includes gum base; and as a plasticizer-sweetener combination, a hydrogenated starch hydrolysate and a major amount of sorbitol, optionally one or more other sugar alcohols, such as mannitol or xylitol; optionally one or more additional sweetening agents, such as sugar and/or non-sugar sweeteners such as any of those described above; and optionally additional flavoring materials, one or more softeners, emulsifiers and/or filler. The preferred chewing gum itself does not require an aqueous plasticizer or syrup such as corn syrup, although such materials may be present, if desired.

The hydrogenated starch hydrolysates employed herein may include those disclosed in U.S. Pat. No. Re. 26,959 or U.S. Pat. No. 3,556,811 as well as various hydrogenated glucose syrups and/or powders which contain sorbitol, hydrogenated disaccharides, hydrogenated tri- or hexa-saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- or hepta-hydrogenated saccharides, and from about 10 to about 65% hydrogenated saccharides higher than hepta.

The preferred chewing gum for use in forming the center-filled chewing gum of the present invention comprises a sugarless chewing gum wherein the hydrogenated starch hydrolysate is employed in combination with sorbitol powder, and optionally, liquid sorbitol, other sugar alcohols, such as mannitol and/or xylitol, and/or gum arabic. The hydrogenated starch hydrolysate will be employed in a weight ratio to the sorbitol powder of within the range of from about 3:1 to about 1:30, preferably from about 0.9:1 to about 0.1:1, and more preferably from about 0.6:1 to about 0.1:1. Such preferred sugarless compositions contain from about 2 to about 60% by weight of hydrogenated starch hydrolysate, and preferably from about 2 to about 20% by weight hydrogenated starch hydrolysate, and the sorbitol powder is present in an amount within the range of from about 10 to about 75%, and preferably from about 10 to about 65% by weight.

In one embodiment of the chewing gum, sorbitol syrup or solution may also be employed in a weight ratio of sorbitol powder:sorbitol solution of within the range of from about 6:1 to about 2:1.

In general, sorbitol syrup may be present in an amount to provide from 0 to about 10% by weight sorbitol and preferably from about 1 to about 8% sorbitol based on the weight of the final chewing gums. Use of the sorbitol in the form of the syrup or solution increases moisture content and thus softness of the gum.

In another embodiment of the chewing gum, gum arabic, preferably in the form of a solution, is employed in combination with the hydrogenated starch hydrolysate and sorbitol powder to provide improved textural properties. The gum arabic will normally be employed as aqueous solutions containing from 30 to about 60% gum arabic, so as to provide an amount of gum arabic of within the range of from 0 to about 4%, and preferably from about 1 to about 3% by weight based on the weight of the chewing gum.

The chewing gum will also preferably include mannitol to provide improved sweetness, texture and processing. The mannitol will be present in an amount ranging from 0 to about 20%, and preferably from about 5 to about 10% based on the weight of the chewing gum.

Where the above-described hydrogenated starch hydrolysate is employed in combination with the sorbitol and optionally mannitol and/or gum arabic, the resulting gum has been found to have a soft, pliable texture superior to sugarless formulations containing no hydrogenated starch hydrolysate. In addition, such chewing gum composition, which usually will be of the non-sugar type, has good softness retention properties and improved flexibility as it ages on the shelf and has excellent extrusion properties.

The hydrogenated starch hydrolysate as described above may be employed as a substitute for corn syrup or other plasticizer or softener, sugar and even sugar alcohols. A typical sugar-free gum formulation may contain from about 2 to about 70%, and preferably from about 4 to about 60% by weight of the hydrogenated starch hydrolysate. Such formulations may include the hydrogenated starch hydrolysate in the form of a powder and/or aqueous syrup; where present, the syrup (2 to 25% hydrogenated starch hydrolysate) will be employed in a weight ratio to the powder of within the range of from about 0.2:1 to about 0.5:1, and preferably from about 0.2:1 to about 0.3:1. The use of the hydrogenated starch hydrolysate in syrup form, as in the case of the sugar alcohols, increases moisture content of the gum formulation and enhances softness properties thereof.

The hydrogenated starch hydrolysate preferably in the form of its syrup, may also be employed in bubble gum formulations to produce a soft, pliable product, the degree of softness being controllable by changing the amount of syrup employed. In the bubble gum formulations of the invention, the hydrogenated starch hydrolysate may be employed with or without sugar (which when present will provide from about 10 to about 90% by weight of the bubble gum formulation) or with artificial or non-sugar sweeteners as described herein.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances or synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any conventional gum bases, such as disclosed for example in U.S. Pat. Nos. 3,052,552 and 2,197,719.

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of the type described above with respect to the liquid center fill may also be employed in the chewing gum itself.

The chewing gum may contain a sugar sweetener or non-sugar sweetener as described above with respect to the center fill. Where present, the natural sugar or sugar alcohol may be employed in an amount ranging from about 85 to about 0.05% by weight of the gum.

The chewing gum may also contain conventional ester gums, polydextrose, fillers, such as calcium carbonate, and texturizers, such as hydrated alumina, plasticizers, softeners or emulsifiers, such as lecithin, fatty acids, glycerin, isomaltitol, glyceryl monostearate, hydrogenated vegetable oils, sorbitan monostearate, tallow, propylene glycol, F.D.&C. coloring agents, and other conventional chewing gum additives as will be apparent to those skilled in the art.

The chewing gum itself may be prepared employing conventional chewing gum manufacturing techniques. However, the various sweeteners and/or hydrogenated starch hydrolysate may be provided in a form to ensure relatively slow release or slow solubilization in the saliva. Thus, for example, the sweetener and/or hydrogenated starch hydrolysate may be coated with, integrated with or encapsulated with non-toxic water-insoluble polymeric substances such as polyvinyl esters disclosed in U.S. Pat. Nos. 3,826,847 and 3,795,744, organic acids as disclosed in U.S. Pat. No. 3,761,288, or other known edible materials as, for example, any of the fusing agents disclosed in U.S. Pat. No. 3,928,633, as well as hydrophilic colloids such as ethyl cellulose, paraffin wax or sodium alginate. The sweetener and/or hydrogenated starch hydrolysate so-modified and employed in conjunction with conventional carriers as described above, will be slowly solubilized in the saliva over extended periods of time.

Alternatively, where it is desired to achieve slow release, non-sugar or artificial sweetener (where employed) will be in particulate form having an average particle size of below about 150 microns (0.150 mm or about 100 mesh), and will be incorporated into the gum base portion of the chewing gum. The particulate compound will be substantially retained in the gum base, and during chewing undergoes slow and controlled release into the saliva.

The preferred chewing gum for use in the present invention may be prepared by admixing melted gum base (heated at, for example, 160°–170° F.), softener, such as lecithin, and color, if desired, optionally adding polyol sweetener, such as mannitol, to the mix, and mixing for 2–5 minutes, adding hydrogenated starch hydrolysate alone or optionally with gum arabic and/or glycerin and mixing for 2 to 7 minutes, adding a portion of the sorbitol and a portion of the flavor while mixing for 2 to 5 minutes, and thereafter repeating the last step adding additional portions of sorbitol and flavor until all the sorbitol and flavor have been added, and then optionally adding spray-dried flavor and mixing the entire mass for 2 to 5 minutes.

The chewing gum portion for use in center-fill gum of the invention may also be prepared by mixing melted gum base (heat at, for example, 160°–170° F.) and color, adding about one-third of the hydrogenated starch hydrolysate and mixing for 1 to 3 minutes, if desired, adding polyol, such as mannitol, to the mix, and mixing for 1–5 minutes, adding sorbitol (in the form of powder), and softener, such as lecithin, flavor, and glycerin (where employed), and when a smooth mixture is obtained, optionally, adding sorbitol solution, then adding the remaining hydrogenated starch hydrolysate alone or with gum arabic, and then optionally adding spray-dried flavor and mixing the entire mass for 2 to 5 minutes.

If desired, the chewing gum formed by the above methods may be mixed with one or more easily extractable water-soluble sweeteners, such as natural sugar, soluble saccharin salts, aspartame, water-soluble food acid and/or flavors. The resulting mix is then formed into sticks or tablets of chewing gum employing conventional techniques.

Where, in the above method, it is desired to employ a soluble non-sugar sweetener in a chewing gum containing an aqueous plasticizer (such as the hydrogenated starch hydrolysate in syrup form), the soluble non-sugar sweetener will be added to the gum base ingredients before the aqueous plasticizer is added thereto. In this manner, the soluble non-sugar sweetener will be transferred to the gum base and will not be first dissolved in the plasticizer.

Regardless of the solubility of the non-sugar sweetener to be added, where long lasting flavor or sweetness is desired, whether it be the hydrogenated starch hydrolysate and/or other sweetener, it is preferred that the particles of non-sugar or artificial sweetener have an average particle size of less than 150 microns to ensure slow controlled release into the saliva.

Preferred sugarless chewing gums for use in accordance with the present invention wherein the hydrogenated starch hydrolysate is employed as a sugar substitute for bulking purposes will have the following compositions:

|  | Parts by Weight |
|---|---|
| Gum base | 18–35 |
| Mannitol | 0–18 |
| Flavor | 0.5–2.5 |
| Sorbitol powder | 30–65 |
| Softener (e.g., lecithin) | 0.5–2 |
| Hydrogenated starch hydrolysate (on wet basis) | 3–20 |
| Gum arabic (based on 30–70% solution) | 0–12 |
| Glycerin | 0–4 |
| Sorbitol solution (based on 40 to 70% solution) | 0–25 |

Preferred sugarless chewing gum formulations for use in accordance with the present invention wherein hydrogenated starch hydrolysate is the sole binding agent and aid in processing are as follows.

|  | Parts by Weight |
|---|---|
| Gum base | 20–35 |
| Mannitol | 6–18 |
| Flavor oil | 0.5–2.5 |
| Sorbitol powder | 30–55 |
| Softener (e.g., lecithin) | 0.5–2 |
| Hydrogenated starch hydrolysate (on wet basis) | 10–18 |
| Glycerin | 0–4 |

Preferred sugarless chewing gum formulations for use in accordance with the present invention wherein hydrogenated starch hydrolysate is employed in conjunction with gum arabic solutions to aid in extrusion are as follows:

|  | Parts by Weight |
|---|---|
| Gum base | 18–30 |
| Mannitol | 0–10 |
| Flavor oil | 0.5–2.5 |
| Sorbitol powder | 40–65 |
| Softener (e.g., lecithin) | 0.5–2 |
| Gum arabic solution (40 to 60% gum arabic) | 4–10 |
| Hydrogenated starch hydrolysate (wet basis) | 5–12 |
| Glycerin | 1–4 |

Preferred sugarless chewing gums for use in accordance with the present invention wherein the hydrogenated starch hydrolysate is employed in conjunction with sorbitol solution (as plasticizer) will have the following compositions:

|  | Parts by Weight |
|---|---|
| Gum base | 18–30 |
| Hydrogenated starch hydrolysate (wet basis) | 5–12 |
| Mannitol | 0–10 |
| Sorbitol powder | 40–60 |
| Sorbitol liquid (50 to 80% solution) | 10–20 |
| Glycerin | 0–4 |
| Softener (lecithin) | 0.5–2 |
| Flavor | 0.5–2.5 |

Preferred sugarless gum formulations for use in accordance with the present invention are as follows:

|  | Parts by Weight |
|---|---|
| Gum base | 18–25 |
| Mannitol | 0–10 |
| Hydrogenated starch hydrolysate (wet basis) | 10–20 |
| Sorbitol powder | 40–60 |
| Softener (lecithin) | 0.5–1.5 |
| Glycerin | 1–3 |
| Flavor | 0.3–1.5 |

Again, the above sugarless chewing gum is particularly suitable for use in making liquid center chewing gum of the invention. However, other conventional sugar-containing or sugarless chewing gum compositions may be employed.

The center-filled chewing gum of the invention may be prepared as described in U.S. Pat. Nos. 3,806,290 and 3,857,963.

The following Examples illustrate preferred embodiments of the present invention without, however, limiting the same thereto. All temperatures are expressed in °F.

EXAMPLE 1

A. A center fill for chewing gum in accordance with the present invention is prepared by adding, with mixing, 1.0 lb. of carboxymethyl cellulose 7 HF (Hercules) to 99 lb. of glycerin (commercial grade containing 2% water) to form a colloidal dispersion. Flavor oil is then added together with coloring to form the center fill.

B. A sugarless chewing gum is prepared from the following ingredients:

|  | Parts by Weight |
|---|---|
| Gum base | 30 |
| Mannitol | 15 |
| Sorbitol powder | 40 |
| Hydrogenated starch hydrolysate syrup (78% solids, including 6% sorbitol and 56% maltitol) | 12 |
| Softener (lecithin) | 1 |
| Spearmint oil | 1 |
| Color | 0.1 |

The gum base is melted (160°–175° F.) and placed in a preheated standard dough mixer equipped with sigma blades. Lecithin and color are added and mixed for 4–5 minutes. Hydrogenated starch hydrolysate syrup is added and mixed for 4–5 minutes. Thereafter, about one-third of the sorbitol is slowly added followed immediately with one-third of the flavor and mixed for about 2–3 minutes. The last step is repeated until all sorbitol and flavor are added.

C. The center-filled gum formed from the above chewing gum portion and center fill is prepared employing the procedure outlined in U.S. Pat. No. 3,857,963.

The center-filled chewing gum so-prepared is found to have excellent sweetness and flavor and a long shelf-life.

EXAMPLES 2 AND 3

Sugarless center-filled chewing gums are prepared from the following ingredients employing the procedure outlined in Example 1 except that 2 lb. of glycerin 7MF (Hercules) containing 2% bound up water is employed in place of the glycerin 7HF, and in preparing the chewing gum portion glycerin is added directly after the hydrogenated starch hydrolysate.

|  | Parts by Weight | |
| --- | --- | --- |
|  | Ex. 2 | Ex. 3 |
| Gum portion | | |
| Gum base | 22 | 24 |
| Mannitol | 8 | 10 |
| Sorbitol powder | 50 | 47 |
| Hydrogenated starch syrup (on dry basis) | 16 | 15 |
| Glycerin | 2 | 2 |
| Lecithin | 0.5 | 0.5 |
| Fruit flavor | 1.5 | 0 |
| Spearmint flavor | 0 | 1.2 |
| Color | 0.05 | 0.1 |
| Center-fill portion | | |
| Glycerin (2% water) | 98 | 97 |
| Flavor oil | 0.2 | 0.5 |
| Carboxymethyl cellulose 7MF | 2.0 | 2.0 |

The Examples 2 and 3 chewing gums are found to have a pleasant sweet taste, good softness retention, improved flexibility properties and excellent extrusion properties, and excellent shelf-life.

EXAMPLES 4 TO 6

Center-filled sugarless chewing gums are prepared from the following ingredients:

|  | Parts by Weight | | |
| --- | --- | --- | --- |
|  | Ex. 4 | Ex. 5 | Ex. 6 |
| Chewing gum portion | | | |
| Gum base | 22 | 22 | 22 |
| Sorbitol powder | 54 | 48 | 47 |
| Sorbitol solution (70%) | 13 | 12 | 12 |
| Hydrogenated starch hydrolysate syrup (dry basis) | 8.5 | 8 | 10 |
| Mannitol | — | 8 | 5 |
| Lecithin | 0.5 | 0.5 | 0.5 |
| Flavor | 1.7 | 1.6 | 1.2 |
| Color | 0.07 | 0.05 | 0.1 |
| Glycerin | — | — | 2 |
| Center-fill portion | | | |
| Glycerin | 98 | 97 | 97 |
| Flavor oil | 0.2 | 0.3 | 0.2 |
| Carboxymethyl cellulose 7HF | 1.0 | 1.5 | 1.0 |

A procedure similar to that described in Examples 1 to 3 is employed except that sorbitol solution and color are added after the hydrogenated starch hydrolysate.

The above chewing gum is found to have properties similar to that of the Examples 1 to 3 gums.

EXAMPLE 7

The chewing gum portion of a center-filled sugarless chewing gum is prepared from the following ingredients:

|  | Parts by Weight |
| --- | --- |
| Chewing gum portion | |
| Gum base | 30 |
| Sorbitol powder | 40 |
| Hydrogenated starch hydrolystae syrup (56% solids, including 6% sorbitol and 56% maltitol) | 12 |
| Softener (lecithin) | 1 |
| Spearmint oil | 1 |
| Color | 0.1 |
| Mannitol | 15 |
| Center-fill portion | |
| Glycerin | 98 |
| Carboxymethyl cellulose 7MF | 2 |

The gum base is melted (160°–175° F.) and placed in a pre-heated standard dough mixer equipped with sigma blades. Color is added and mixed for 3–4 minutes. About one-third of the hydrogenated starch hydrolysate syrup is added and mixed for 1–3 minutes. Mannitol is added and mixed for 1–2 minutes. Thereafter, the sorbitol is slowly added followed immediately with lecithin and flavor and mixed for about 2–3 minutes. The remaining hydrogenated starch hydrolysate is added and the mixture mixed for 2–5 minutes.

The above chewing gum together with the center-fill composition as described in Example 1 are employed to form a center-filled chewing gum which is found to have a pleasant sweet taste, good softness retention and improved flexibility properties upon aging and excellent extrusion properties, and excellent shelf-life.

EXAMPLES 8 AND 9

Sugarless center-filled chewing gums are prepared from the following ingredients employing the procedure outlined in Example 7 except that glycerin is added directly after the sorbitol powder in the chewing gum portion.

|  | Parts by Weight | |
| --- | --- | --- |
|  | Ex. 8 | Ex. 9 |
| Chewing gum portion | | |
| Gum base | 22 | 24 |
| Mannitol | 8 | 10 |
| Sorbitol powder | 50 | 47 |
| Hydrogenated starch hydrolysate syrup (on dry basis) | 16 | 15 |
| Glycerin | 2 | 2 |
| Lecithin | 0.5 | 0.5 |
| Fruit flavor | 1.5 | 0 |
| Spearmint flavor | 0 | 1.2 |
| Color | 0.05 | 0.1 |
| Center-fill formulation | | |
| Glycerin | 97 | 97 |
| Carboxymethyl cellulose 7MF | 2 | 2 |
| Flavor | 0.25 | 0.5 |
| Sweetener | 0.10 | 0.2 |

The Examples 8 and 9 center-filled chewing gums are found to have a pleasant sweet taste, good softness retention, improved flexibility properties and excellent extrusion properties.

EXAMPLES 10 TO 12

Sugarless center-filled bubble gums are prepared from the following ingredients:

|  | Parts by Weight | | |
| --- | --- | --- | --- |
|  | Ex. 10 | Ex. 11 | Ex. 12 |
| Chewing gum portion |  |  |  |
| Bubble gum base | 22 | 26 | 26 |
| Sorbitol powder | 57 | 49 | 49 |
| Hydrogenated starch hydrolysate syrup | 15 | 18 | 18 |
| Mannitol | 5 | 5 | 5 |
| Lecithin | 0.2 | 0.3 | — |
| Flavor | 0.7 | 1.5 | 1.5 |
| Center-fill portion |  |  |  |
| Glycerin | 98 | 98 | 98 |
| Carboxymethyl cellulose 7HF | 1 | 1 | 1 |
| Pectin | 0.5 | 0.8 | 0.6 |
| Gum tragacanth | 0 | 0.2 | 0.3 |

A procedure similar to that described in Examples 1 to 6 is employed in preparing the above bubble gums.

The above bubble gums are found to have a pleasant sweet taste, excellent softness retention, and improved flexibility and extrusion properties.

What is claimed is:

1. A center-filled chewing gum having improved softness retention, flexibility, and excellent shelf-life comprising a chewing gum piece including an enclosed cavity therein, and a liquid fill in said cavity, said liquid fill consisting essentially of from about 94 to about 99.5% glycerin as a sweetener, from about 0.5 to about 6% by weight of a thickener to increase viscosity of the glycerin, said thickener being selected from the group consisting of carboxymethyl cellulose, a pectin, an alginate, agar, gum tragancanth, sodium carboxymethyl cellulose, and mixtures thereof, and optionally from about 0.1 to about 0.75% by weight flavor oil, said center fill containing no more than about 2% or less water and no further humectants.

2. The center-filled chewing gum as defined in claim 1 wherein said glycerin is present in an amount within the range of from about 95 to 99% by weight of said liquid fill.

3. The center-filled chewing gum as defined in claim 1 wherein said thickener is a natural or synthetic gum.

4. The center-filled chewing gum as defined in claim 3 wherein said thickener is carboxymethyl cellulose, a pectin, an alginate, agar or gum tragacanth.

5. The center-filled chewing gum as defined in claim 1 wherein said chewing gum piece is formed by sugarless chewing gum.

6. The center-filled chewing gum as defined in claim 1 wherein said thickener is carboxymethyl cellulose or sodium carboxymethyl cellulose present in an amount of from about 1 to about 3% by weight of the center fill.

7. The center-filled chewing gum as defined in claim 1 wherein said glycerin contains up to about 2% by weight bound-up water.

8. The center-filled chewing gum as defined in claim 1 further including one or more flavors and artificial sweeteners.

9. A sugarless liquid fill for center-filled chewing gum, said liquid fill consisting essentially of from about 94.0 to about 99.5% by weight glycerin, from about 0.5 to about 6% by weight of a thickener, said thickener being selected from the group consisting of carboxymethyl cellulose, a pectin, an alginate, agar, gum tragacanth, sodium carboxymethyl cellulose, and mixtures thereof, and optionally from about 0.1 to about 0.75% by weight flavor oil, said liquid fill containing no more than about 2% or less of water and no further humectants.

10. The center-filled chewing gum as defined in claim 9 wherein said thickener comprises carboxymethyl cellulose or sodium carboxymethyl cellulose.

11. A process for preparing a center-filled chewing gum as defined in claim 1, which comprises adding a thickener to glycerin to form a center fill and incorporating the center fill into the cavity of said chewing gum piece.

12. The process as defined in claim 11 wherein said thickener is carboxymethyl cellulose or sodium carboxymethyl cellulose.

13. The process as defined in claim 11 wherein said glycerin comprises 95 to 99% of said center fill and said thickener comprises 1 to 5% said center fill.

* * * * *

UNITED STATES PATENT AND TRADEMARK OFFICE
CERTIFICATE OF CORRECTION

PATENT NO. : 4,316,915
DATED : February 23, 1982
INVENTOR(S) : Dominick R. Friello, et al.

It is certified that error appears in the above-identified patent and that said Letters Patent are hereby corrected as shown below:

Column 3, Line 59, "or" should read as --to--.

Column 4, Life 3, "or" should read as --to--.

Signed and Sealed this

First Day of June 1982

[SEAL]

Attest:

GERALD J. MOSSINGHOFF

Attesting Officer

Commissioner of Patents and Trademarks